United States Patent [19]
Busselmeier

[11] 3,847,393
[45] Nov. 12, 1974

[54] SNAP COUPLING FOR FLUID CONDUITS
[76] Inventor: Otto Busselmeier, Hebbelstrasse 15, 1528-Ennepetal, Germany
[22] Filed: July 25, 1972
[21] Appl. No.: 275,080

[30] Foreign Application Priority Data
July 30, 1971 Germany............................ 2138103

[52] U.S. Cl.................. 285/315, 285/243, 285/321
[51] Int. Cl............................................ F16l 37/12
[58] Field of Search .......... 285/308, 315, 316, 277, 285/321, 320, DIG. 22

[56] References Cited
UNITED STATES PATENTS

| | | | |
|---|---|---|---|
| 978,957 | 12/1910 | Sutton................................ | 285/315 |
| 2,318,965 | 5/1943 | Parker et al. .................... | 285/277 X |
| 2,344,740 | 3/1944 | Shaff.............................. | 285/316 X |
| 3,439,943 | 4/1969 | Thorne-Thomsen................ | 285/316 |
| 3,468,562 | 9/1969 | Chow et al...................... | 285/277 X |

Primary Examiner—Thomas F. Callaghan
Attorney, Agent, or Firm—Michael S. Striker

[57] ABSTRACT

A female coupling element has a circumferential wall bounding an inner space and provided with apertures which communicate with the same. A male coupling element can be axially inserted into this inner space. An acutating element externally surrounds the female coupling element and can be shifted longitudinally thereof to and from an operative position. An arresting arrangement has a plurality of noses each of which is biassed through one of the apertures from the exterior of the female coupling element into the space of the latter, and cooperating abutments are provided on the male coupling element which are engageable with these noses to retain the male coupling element in the space once it has been inserted thereinto. A releasing arrangement comprises cooperating releasing portions on the arresting arrangement and on the actuating element to displace the noses out of the inner space when the actuating element is shifted to its operative position.

25 Claims, 21 Drawing Figures

SNAP COUPLING FOR FLUID CONDUITS

BACKGROUND OF THE INVENTION

The present invention relates generally to a coupling, and more particularly to a snap coupling for fluid conduits, such as liquid and gas conduits.

It is already known to provide snap couplings for fluid conduits wherein a female coupling element is to be connected to one conduit and a male coupling element to the other conduit, with the two coupling elements being connectable by snapping them together, and being removable by releasing their snap-action engagement. The release is effected by an actuating element which does not move when the male and female coupling elements are snapped together, but which is shifted from a rest position to an operating position when they are to be disengaged. Arresting means are provided in this known construction which engage the actuating element when the male coupling element is received in the female coupling element, to prevent undesired withdrawal of the former from the latter. The actuating element of this known construction is provided with recesses which, when the actuating element is located in a released position, are positioned at the level of the arresting elements so that the latter can move outwardly when a pull is exerted on the male and female coupling elements in the sense tending to separate them.

The difficulty with this prior-art construction in which the arresting elements themselves must be shifted radially outwardly to permit separation of the male and female coupling elements, is that the various components must be manufactured to very close tolerances. If more than minimum amount of play is permitted, the male coupling element is no longer reliably retained in the female coupling element and undesired separation can occur. Moreover, a separate spring is provided for biasing the actuating element to its normal rest position, and in addition the number of components needed and the overall complexity of the construction are such that the known snap coupling is expensive.

SUMMARY OF THE INVENTION

It is, accordingly, a general object of the present invention to provide an improved snap coupling of the type under discussion, which avoids the disadvantages of the prior art.

More particularly it is an object of the invention to provide such an improved snap coupling for fluid conduits which does not require that its components be dimensioned to very precise tolerances, but which nevertheless assures a reliable engagement of the male and female coupling elements against undesired separation.

An additional object of the invention is to provide such a snap coupling which has a relatively small number of components, with these components being simple and readily producable.

Still another object of the invention is to provide such a snap coupling which has a rather short overall axial length.

In pursuance of these objects, and of others which will become apparent hereafter, one feature of the invention resides in a snap coupling for fluid conduits which, briefly stated, comprises an elongated female coupling element having a wall portion bounding an inner space and provided with apertures communicating with the latter. A male coupling element is removably accommodatable in this inner space. An actuating element surrounds the female coupling element externally and is shiftable longitudinally thereof from a normal rest position to an operative position. Arresting means comprises a plurality of noses each of which is biassed through one of the apertures into the aforementioned inner space, and cooperating abutments provided on the male coupling element and engageable with these noses serves to couple the male and female elements with one another. Releasing means for releasing the arresting means comprises cooperating lever portions on the arresting means and engaging portions on the actuating element for effecting pivotal displacement of the aforementioned noses out of the inner space in response to shifting of the actuating element to its operative position.

This construction assures that the arresting means, and in particular the noses thereof, will necessarily be withdrawn out of the inner space in response to displacement of the actuating element to its operative position. The tolerances for the individual components can be relatively large because the noses perform in effect a pivoting movement into and out of the inner space, and because when an axial stress is exerted upon the male and female coupling elements in sense tending to separate them, but without the actuating element having been moved to an operative position, this will only serve to pivot the noses further inwardly of the inner space and thus to more reliably cause them to maintain the male and female coupling elements in engagement.

The coupling according to the present invention can be particularly compact in its construction in that the arresting means is so configurated that from each nose there extend lever arms which project in mutually opposite directions from the nose and which each have approximately the form of a quarter of a circle. The free ends of these lever arms are then engaged by the engaging portions of the actuating element. Also, spring portions extend in mutually opposite directions from the nose and are located in a plane which is approximately parallel to that of the lever arms.

A further embodiment of the invention provides for the use of only two noses which are located opposite one another and extend into an annular recess of the male coupling element when the latter is received in the inner space of the female coupling element. In such a construction the components can be produced from synthetic plastic material very readily, and the tools or dyes required for injection molding of the components can be particularly simple in their construction. The noses may either be part of a single arresting element, or they may each belong to a separate arresting element. In the latter case the spring portions each have the configuration of approximately one quarter of a circle, in keeping with that of the lever arms. If the noses are provided on a single arresting element, then the spring portions define a circumferentially complete annulus. They will, however, be located in a plane approximately paralleling that of the lever arms and the latter are then connected with the annulus constituted by the spring portion by webs which are located in the region of the respective noses. The free ends of the lever arms may radially project beyond the annulus of spring portions, to be engaged by the actuating element so that the engaging portions of the latter can slide past the spring portions during movement of the actuating element between its rest positions and operative positions.

In order to permit a precise positioning of the pivot point for the noses of the arresting means, the latter is prevented by an abutment against radial displacement from its desired position. Advantageously, this abutment is located in the region of the nose approximately at the level of the spring portions, and the abutment can be provided in form of projection provided on the arresting means and abutting the inner surface of the actuating element, but it is currently preferred to provide the abutment exclusively in the female coupling element in order to absorb the axial radial force components. In this manner the positioning of the pivot point is entirely independent of the construction of the actuating element itself, so that the permissible tolerant variations may be even more liberal. The aforementioned force components develop during the snap-action coupling and uncoupling of the male and female coupling elements, but particularly when the elements are connected with one another and the interior of the coupling and of the conduits which it connects, is under pressure.

A further embodiment of the invention, particularly advantageous with a view to simplifying the production of the coupling, there can be achieved by providing the aperture in the female coupling element in form of open-ended slots. In this case the arresting means can be axially inserted into these slots and be fixed by a sleeve which snaps into engagement with the female coupling element. In such a manner the arresting means can then be utilized in form of the aforementioned configuration where a circumferentially complete annulus of spring portion is provided, as well as two noses. The embodiment is, however, advantageous even if the arresting means comprises more than one arresting element.

It will be appreciated that the abutment need not necessary be located in the region of the respective nose approximately at the level of the spring portions. It is also possible to provide the ends of the spring portions with hooks which either can engage a projection of the female coupling element, or which can interengage with one another. In the latter case the effect is analogous to a circumferentially complete annulus of spring portions.

It is advantageous if the arresting means with its various cut out portions such as noses, lever arms and spring portions is of synthetic plastic material, advantageously of one piece, in order to obtain advantages offered by the manufacture of plastic both in terms of material expenses, manufacturing expenses and assembly. Of course, other components of the snap coupling can also be of synthetic plastic material.

The spring portions may, incidentally, be used not only for biasing the noses inwardly into the interior base of the female coupling element, but they can also be utilized for biasing the actuating element normally to its rest position. This eliminates the need for providing a special biasing spring or similar means for this purpose, thus reducing not only the number of components required but also the overall axial length of the coupling.

The engaging portions may be provided in form of projections on the inner wall of the actuating element, and these projections may be so located that a guide groove exists between at least some of then into which a guide rib of the female coupling element can enter, thus preventing angular displacement of the actuating element with respect to the female coupling element. It is particularly advantageous, however, if the actuating element is provided on its axial end facing away from the male coupling element with several (preferably four) axial grooves or slots into which a corresponding number of guide ribs on the female coupling element can extend. This provides a particularly small retention against angular displacement of the actuating element and female coupling element, which is advantageous because when the fluid conduits are connected with the coupling elements strong angular forces tending to effect such angular displacement, almost invariably develop.

Novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Before entering into a detailed discussion of the various Figures it is pointed out that like reference numerals in all embodiments designate like elements.

Generally speaking, and with reference to all of the embodiments, it will be seen that the novel snap coupling according to the present invention comprises two coupling elements, namely a female coupling element 2 and a male coupling element 1. The male coupling element 1 is connected with a device, an armature, a conduit or the like, in suitable manner, for instance via a screw thread 3. It can of course be of one piece with the conduit or other element. The female coupling element 2 can for instance be connected with a fluid conduit which is not illustrated in detail, but for which purpose the female coupling element 2 is provided with a nipple 4 at the axial end which is remote from the male coupling element 1. In addition, the female coupling element 2 is provided with engaging claws 5, which are pressed against the conduit when the same is pushed over the nipple 4 to become located between the same and the claws 5, such pressure being effected in response to tightening of the nut 6 whose conical portion 7 will then engage the claws 5 and press the same inwardly against the conduit. This will reliably connect the coupling element 2 with the conduit, the latter of course being a hose or any other suitable conduit.

The female coupling element 2 is provided with an interior valve space 8 in which there is located a one-way valve 9 which is guided and supported by ribs 10 and which is automatically opened in response to insertion of the male coupling element 1 into the female coupling element 2 and will automatically close in response to withdrawal of the male coupling element 1 from the female coupling element 2. The closure is effective by the pressure existing in the nipple 4, that is in whatever conduit the female coupling element 2 is connected with. It will be appreciated that the valve 9 is known per se and requires no detailed discussion.

The leading end of the male coupling element 1, that is the one with which it is inserted into the female coupling element 2, is provided with a circumferential recess in which there is located a sealing ring 11. An annular groove 12 is formed between the threads 3 and the ring 11, and the two noses 13 of two arresting elements 15 and 16 engage in this annular groove 12 (they could also be provided on a single arresting element 14, as will be discussed subsequently with respect to FIG. 18). The noses 13 extend inwardly into the interior of the female coupling element 2 through apertures 17 provided for this purpose in the wall of the element 2. The element 2 is formed with an inner space 18 so dimensioned that it can accommodate the insertable portion of the male coupling element 1, and it is into this space 18 that the noses 13 project.

Figure 1:
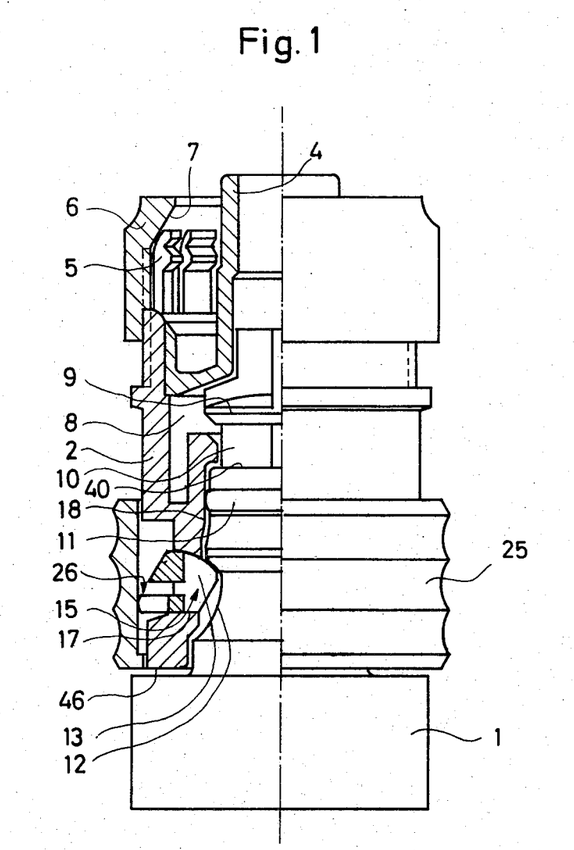
FIG. 1 is a view of one embodiment of the invention, with the left-hand side shown in section.
Figure 2:
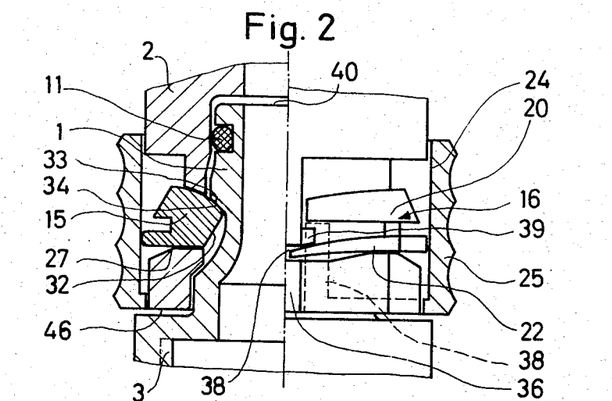
FIG. 2 is a fragmentary detail view illustrating the embodiment of FIG. 1 in one operative position, the view being partly sectioned.
Figure 3:
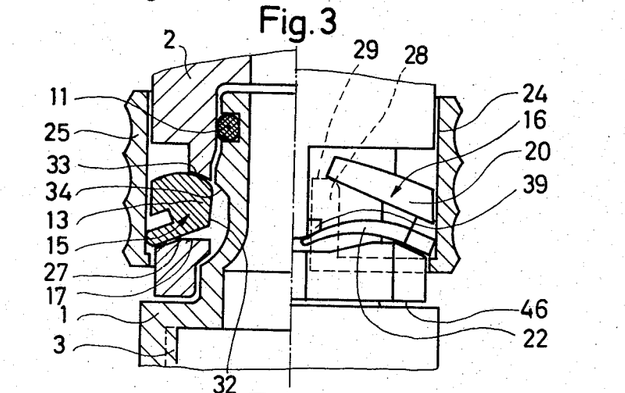
FIG. 3 is a view similar to FIG. 2 but illustrating the embodiment in another operative position.
Figure 5:
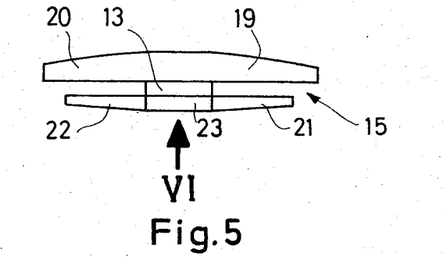
FIG. 5 is a side view of an arresting element for use in the coupling according to the present invention, as seen in the direction of the arrow V of FIG. 6.
Figure 6:
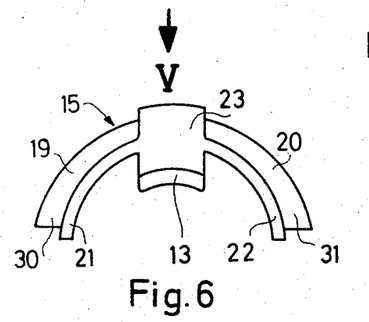
FIG. 6 is a plan view of FIG. 5, as seen in the direction of the arrow VI.
Figure 7:
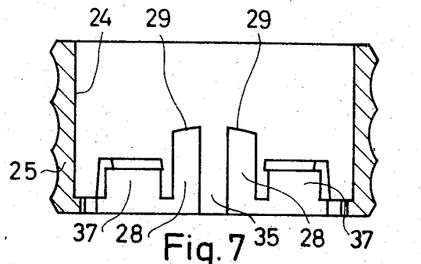
FIG. 7 is an axial section through a component for use in the coupling according to the present invention.

Discussing now the specific embodiment in FIGS. 1-3, which should be considered in conjunction with FIGS. 5, 6 and 7, it will be seen that the arresting elements 15 and 16 utilized in this embodiment have the configuration which is particularly evident from FIGS. 5 and 6 where the element 15 (which is also representative of the element 16) is described and shown in detail. Each of the elements 15 and 16 has a nose 13, and from this nose 13 there extend in opposite directions two lever arms 19 and 20 which in the illustrated embodiment each have approximately the form of a quarter circle, as shown particularly in FIG. 6. Additionally, spring portions 21 and 22 also extend in mutually opposite directions from the nose 13 and have approximately the same configuration as the arms 19 and 20. The arms 19 and 20, however, extend radially farther than the spring portions 21 and 22. FIG. 5 shows that the arms 19 and 20 on the one hand, and the spring portions 21 and 22 on the other hand, are located in approximately parallel planes.

In the region of the nose 13 there is provided a projection 23 approximately at the level of the spring portions 21 and 22. The projection 23 engages the inner circumferential wall surface 24 of the actuating element 25 which is annular and exteriorly surrounds the female coupling element 2 being axially slidable thereon between a normal rest position shown in FIG. 2 and an operating position shown in FIG. 3. In connection with the projection 23, the wall surface 24 constitutes an abutment 26 which defines a pivot point 27 for the respective arresting elements 15, 16.

The inner circumferential wall surface 24 of the actuating element 25 is provided with projections 28 the end faces of which constitute engaging portions 29 which engage the free ends 30, 31 of the lever arms 19 and 20, respectively.

As the figures clearly show, the noses 13 have a relatively slightly inclined surface 32 and a more steeply retaining surface 33. The latter extends behind and engages a steep cooperating flank 34 of the annular groove 12 when the male coupling element has ben inserted into the space 18 of the female coupling element 2. FIG. 7 shows that here two adjacents ones of the projections 28 are so located that they define with one another a guide slot or groove 35 which can accommodate a guide rib 36 projecting from the female coupling element 2, as shown in FIG. 2. This prevents angular displacement of the actuating element 25 with reference to the female coupling element 2, and assures that only a relative axial movement can be performed.

The actuating element 25 is provided with detents 37 which, when the actuating element 25 has been placed about the female coupling element 2 after insertion of the arresting elements 15, 16, will engage with the female coupling element 2 so as to assure that the slidable actuating element 25 is fixed in one axial direction. This facilitates the assembly of the components.

When the arresting elements 15, 16 are placed in requisite position, care is taken that the noses 13 extend through the respective apertures 17 into the recess or inner space 18, and that the ends of the spring portions 21, 22 abut against and are supported against the abutments 38 provided on the portions 36. The abutments 38 can be extended by additional abutments 39 on the female coupling element 2. This construction makes the assembly of the coupling element 2 particularly simple, because it is merely necessary to insert the arresting elements 15 and 16 radially from the outside, whereupon the actuating element 25 is pushed axially onto the coupling element 2 until it engages the same with a snap action. The actuating element 25 is guided on the female coupling element 2 with very little play, in order to counteract possible contamination of the internal components of the coupling, that is to prevent the intrusion of such contaminants.

Normally the actuating element 25 will be in the rest position shown in FIGS. 1 and 2. When the male and female coupling elements 1 and 2 are to be coupled with one another, they are simply engages and the male coupling element 1 is axially inserted into the space 18 of the female coupling element. The actuating element 25 remains stationary during such coupling, and the end face 40 of the male coupling element 1 pushes the noses 13 radial outwardly by engaging the surfaces 32. When the male coupling element 1 has entered sufficiently deeply into the space 18, the noses will snap back in under the action of the spring portions 21 and 22, to engage in the annular groove 12 as shown in FIG. 1. If under these circumstances a pull is exerted on the elements 1 and 2 in a sense tending to separate them, such separation is impossible because the engagement of the noses 13 with the flank 34 reliably prevents such separation.

If, however, it is desired to separate the members 1 and 2 from one another, then the actuating element 25 is engages and axially shifted in direction towards the nipple 4. In response to this movement the portions 29 press against the free ends 30, 31 of the arms 19, 20. This in turn effects outward pivoting of the noses 13 about the respective pivot points 27, causing them to become withdrawn from the groove 12 and from the inner space 18 as is indicated in FIG. 3. The male coupling element 1 can now be readily withdrawn from the female coupling element 2.

It will be appreciated that the separation of the male and female coupling elements 1 and 2 is very simple and effortless under these circumstances, because it is merely necessary to engage the actuating element 25 with one hand and the male coupling element 1 (or a component connected with the same) with the other hand, and to pull them axially apart. The separation of the elements 1 and 2 is therefore as simple as is their initial coupling, and this is particularly advantageous because the separation is merely the result of the movement which is the reverse of the original coupling movement.

It has been mentioned before that the arms 19, 20 extend radially outwardly beyond the spring portions 21 and 22. Because of this the operation of the actuating element 25, that is the axial shifting of the same, will cause the projections 28 to move passed the spring portions 21 and 22 and only to engage the arms 19, 20. It is clear that the arresting elements 15 and 16 perform not one but three functions, in that they springily engage in the groove 12 and prevent undesired separation of the elements 1 and 2, in that the further release the coupling connection in response to the movement of the actuating element 25 to its operative position, and in that finally they urge the actually element 25 permanently to its rest position shown in FIG. 1. This results in a particularly simple and axially short construction, and is highly advantageous.

Figure 4:
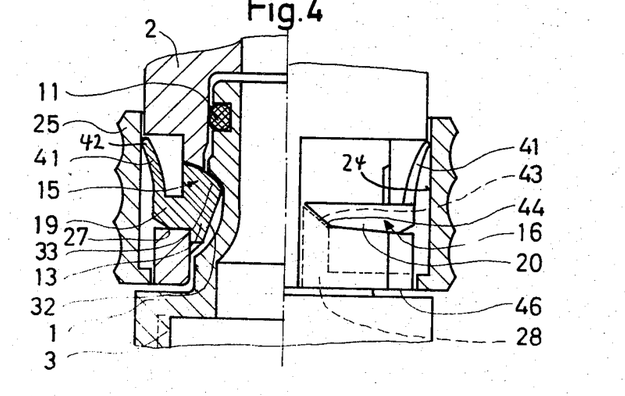
FIG. 4 is a view similar to FIG. 2 illustrating a further embodiment of the invention.

The embodiment in FIG. 4 resembles that of FIGS. 1 and 3, except that the arresting elements 15 and 16 are each provided with only one spring portion 41 which extends approximately normal to the arms 19 and 20. The free end 42 of the respective spring portion 41 abuts against the inner circumferential wall surface 24 of the actuating element 25. In this construction it will be appreciated that the portions 25 of the actuating element 25 can also engage with inclined faces 43 on correspondingly inclined cooperating faces 44 of the arms 19, 20. Here, a portion of the radial forces is absorbed in the female coupling element 2 itself.

Figure 8:
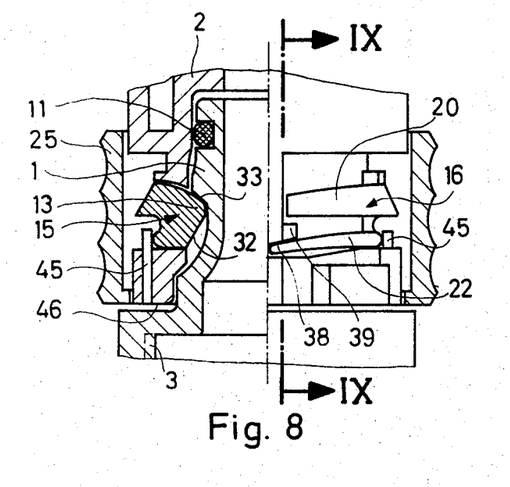
FIG. 8 is a view similar to FIG. 2 but illustrating another embodiment of the invention.
Figure 9:
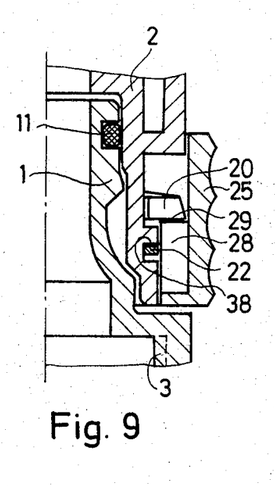
FIG. 9 is a section taken on line IX—IX of FIG. 8.

It has been previously pointed out that it is desirable and possible according to the present invention, to liberally select the tolerance variations for the individual components. This possibility is further enhanced if the abutment 26 for the respective arresting elements 15 and 16 — provided to absorb the axial and radial force components — is located exclusively in the female coupling element 2. Reference to FIGS. 8 and 9 will show that here the abutment 26 is constituted by a pin 45 inserted into the female coupling element 2 from the end face 46 thereof, and operative to prevent a radial outward movement of the arresting elements 15, 16 in the region of the spring portions 21, 22. It will be appreciated that with such a construction the play existing between the actuating element 25 and the female coupling element 2 will not be able to exert any influence upon the position of the pivot point 27.

FIG. 9 in particular shows how the projection 21 engages with its end face as the portion 29 the arm 20 of the arresting element 16 and how it slides passed the spring portion 22 the end of which abuts against the abutment 38. The pins 45 are press fitted into recesses or bores provided in the female coupling element 2. They may be of circular or non-circular cross section, for instance of rectangular or quadratic cross section and several of them may be located adjacent one another.

Figure 10:
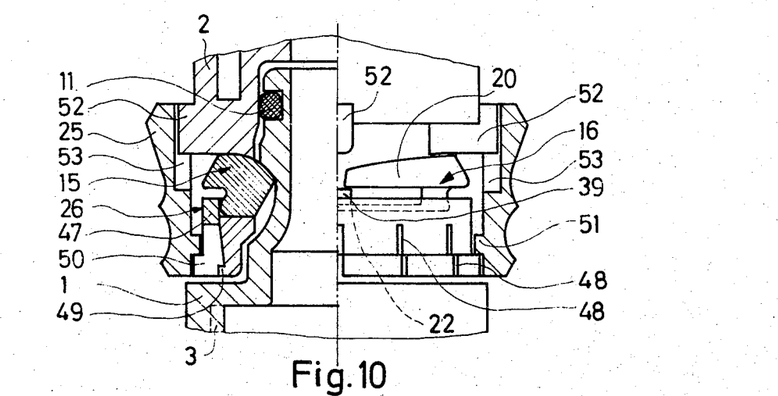
FIG. 10 is a view similar to FIG. 2, illustrating an additional embodiment of the invention.

In FIG. 10 I have illustrated a further advantageous embodiment of the invention. Here, also, there are provided two arresting elements 15 and 16 which are configurated in the manner shown in FIGS. 5 and 6, but with the projections 23 having been omitted. The abutment 26 is here constituted by an annulus 47 which is pushed from below over the female coupling element 2 and the lower region of the arresting elements 15, 16 and which is provided on its axial side facing away from the arresting elements 15 and 16, with slots 48 to thereby form springy tongues which snap together with hooks 49 in the female coupling element 2, to obtain a reliable connection against relative axial movement.

It will be seen in FIG. 10 that the annulus 47 is provided with a bead 50 which limits the axial displacement of the actuating element 25, for which purpose the inner circumferential wall surface 24 thereof is provided with a cooperating projection 51. The securing against relative angular displacement is here advantageously effected by providing several (four shown) ribs 52 on the female coupling element 2, being rearwardly extended from the end face 46. Grooves 53 are provided in the actuating element 25, adapted to each receive one of the ribs 52. By recessing the ribs 52 from the end face 46 it is possible to make the arms 19, 20 somewhat longer than could otherwise be achieved.

Figure 11:
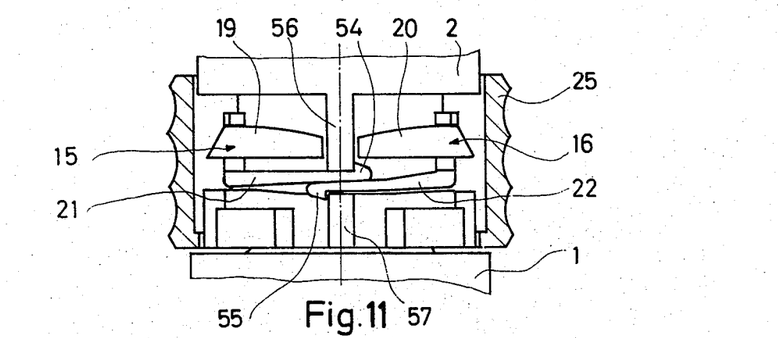
FIG. 11 is a partly sectioned elevational view illustrating a detail of another embodiment of the invention.
Figure 12:
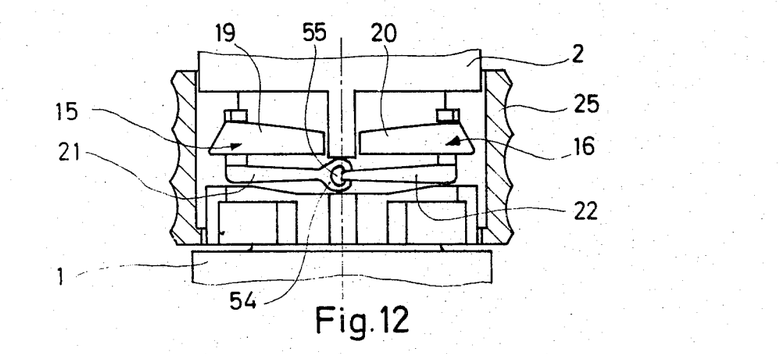
FIG. 12 is a view similar to FIG. 11, illustrating still a further embodiment of the invention.
Figure 13:
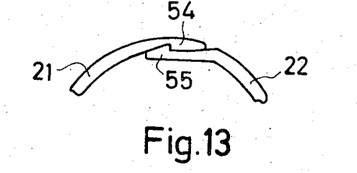
FIG. 13 is a plan view of two components of a further embodiment.
Figure 14:
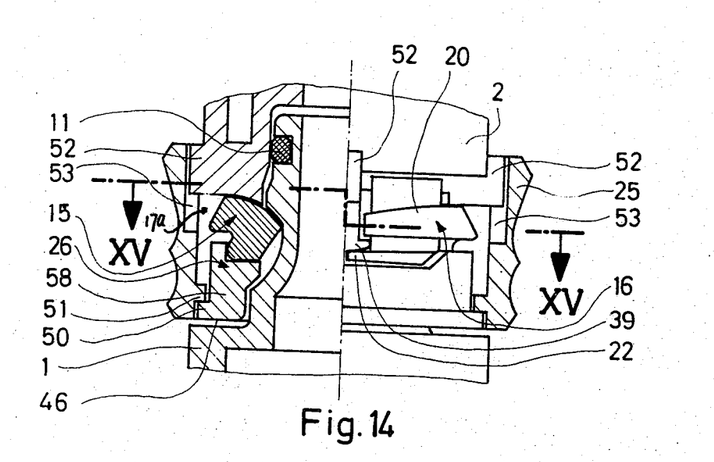
FIG. 14 is a view similar to FIG. 2, illustrating an additional embodiment of the invention.
Figure 15:
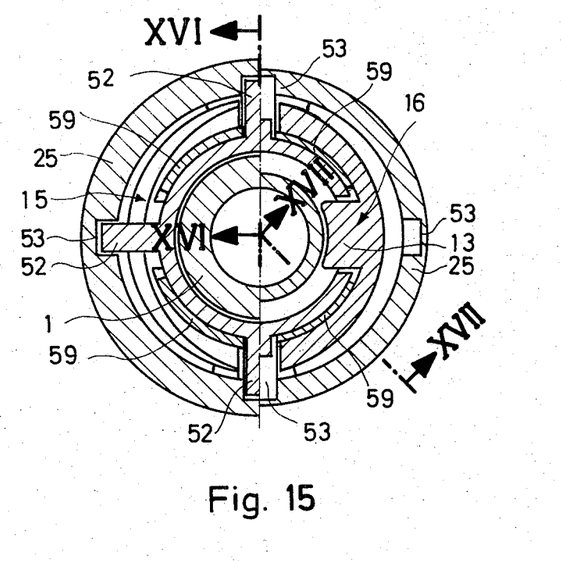
FIG. 15 is a section taken on line XV—XV of FIG. 14.
Figure 16:
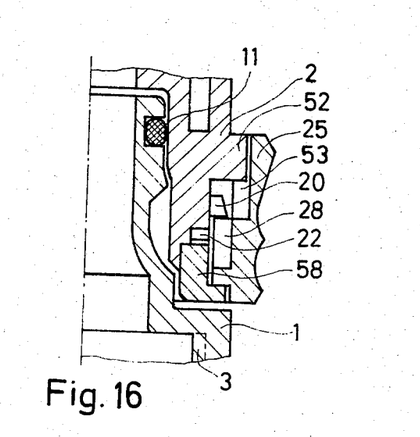
FIG. 16 is a section taken on line XVI—XVI of FIG. 15.

In the embodiments described with respect to FIGS. 8–10 supporting takes place with respect to the outer circumference of the arresting elements 15 and 16. In the embodiments of FIGS. 11–13 this purpose is achieved by the end portions of the spring portions 21, 22 of the arresting elements 15 and 16.

Referring particularly to FIG. 11 it will be seen that the end portions of the spring portions 21, 22 are provided with hooks 54, 55 which engage with projections 56, 57 provided for this purpose on the female coupling element 2. This means that the radial force components are transmitted via the spring portions 21, 22 in tension to the female coupling element 2. Lateral abutments on the element 2 for the arresting elements 15, 16 can be omitted in this embodiment.

In FIG. 12 the hooks 54, 55 are so configured that they no longer engage the female coupling element 2, but instead engage with one another. This means that the spring portions now together constitute an annulus and that the radial force components are absorbed by this annulus, relieving the female coupling element 2 entirely.

A variation of the embodiment of FIG. 12 is shown in FIG. 13 where the configuration of the hooks 54, 55 is slightly different to assure that under the influence of the tensile forces acting upon them they cannot become disengaged, because the projections 28 will slide over the spring portions 21, 22 in the vacinity of the interengagement of the hooks 54, 55 so that the spring portions 21, 22 are retained radially against movement.

Figure 17:
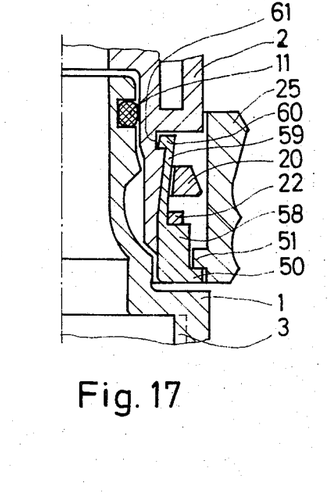
FIG. 17 is a section taken on line XVII—XVII of FIG. 15.

A further embodiment of the invention is illustrated in FIGS. 14–17. It also utilizes two arresting elements 15, 16. Analagous to the embodiment of FIG. 10, the abutment 26 is constituted by an annulus 58 which is coupled by a snap-action coupling with the female coupling element 2. The embodiment in FIGS. 14–17 differs from that of FIG. 10, however, in that the apertures 17a provided in the female coupling element 2 are not configurated as circumferentially complete apertures but instead are configurated as open-ended slots. Thus, the arresting elements 15, 16 can be inserted into these slots axially from the end face 46. After the actuating element 25 has then been slipped over the female coupling element 2, the annulus 58 is inserted. It has four lugs 59 (see FIG. 15) whose ends are provided with hooks 60 as shown in FIG. 17, which hooks engage in a recess 61 provided for this purpose in the female coupling element 2. The Figures show that the lugs 59 extend in the space between the female coupling element 2 and the arresting elements 15, 16. The annulus 58 is also provided with a bead 50 in order to limit the axial displacement of the actuating element 25 in the direction towards the end face 46. Four guide ribs 52 are again provided, each extending into a groove 53 formed in the coupling element 2 in order to provide high resistance to relative angular displacement of the elements 2 and 25.

The drawing also shows, especially in FIG. 17, that the lower end of the coupling element 2 is slightly conical in order to assure that on insertion of the lugs 59 the latter are outwardly displaced and the hooks 60 will properly engage. The engagement between the element 2 and the annulus 58 could also be effected between the end face 46 and the arresting elements 15, 16, in which case it would be desirable to have the annulus 58 be rigid and the lower end portion of the female coupling element 2 be subdivided into elastic tongues, for instance by appropriate slots.

Figure 19:
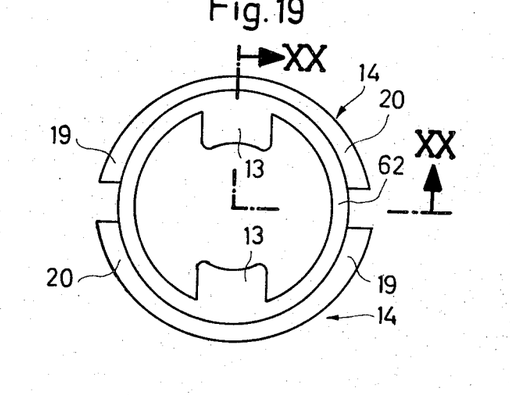
FIG. 19 is a top-plan view of a component for use in the coupling according to the present invention.
Figure 20:
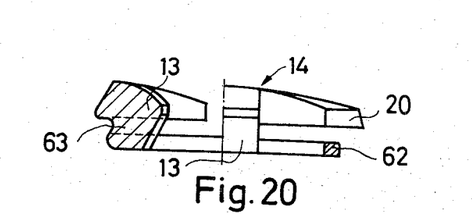
FIG. 20 is a section taken on line XX—XX of FIG. 19.

If the openings for the noses are configurated as open-ended slots 17a, then it is also possible to use a single arresting element 14 whose configuration is shown in FIGS. 19 and 20. In such a case two noses 13 will be provided, located oppositely one another, with respective arms 19 and 20 again extending from each of the noses in opposite directions. The spring portions, however, are here configurated as a circumferentially complete annulus 62 which is located in a plane approximately paralleling that of the arms 19, 20 and is connected with the latter via the noses 13 or webs 63.

Figure 18:
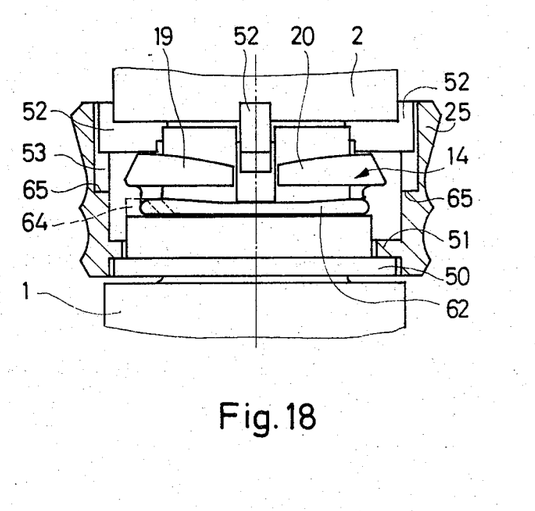
FIG. 18 is a view similar to FIG. 11 but illustrating still another embodiment.

Reference to FIG. 18 will show how the arresting element 14 is inserted into the female coupling element 2. In particular, it is simply inserted from the end face 46, with the noses 13 being guided in the slots 17a. Subsequent to insertion of the arresting element 14 and a positioning of the actuating element 25 in its proper location, the annulus 47 or 58 is put in place and connected by snap action with the female coupling element 2. As shown in broken lines in the left-hand side of FIG. 18, this annulus may have shoulders 64 which provide further assurance against radial displacement. The bead 50 limits the axial displacement of the actuating element 25 in downward (in the drawing) direction, whereas the limitation of such movement in upward (again in the drawing) axial direction is effected by the ends 65 of the grooves 53 when they are abutted with the end faces of the ribs 52.

Figure 21:
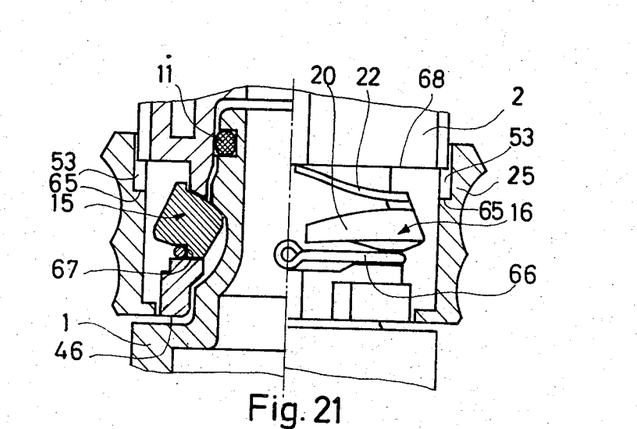
FIG. 21 is a view similar to FIG. 2 but illustrating still a further embodiment of the invention.

Coming, finally, to the embodiment illustrated in FIG. 21 it will be seen that here I again utilize two arresting elements 15, 16. In this embodiment, however, the arresting elements are so inserted into the coupling element 2 that the spring portions 19, 21 face away from the end face 46. An annulus 66, for instance a wire ring or the like, absorbs the radial forces. For insertion into the annular groove 67 the annulus 66 is circumferentially incomplete, but its end portions are interengaged once the insertion is completed. The interengagement can be effected in any desired manner for instance by hooking the end portions together. The spring portions 21 and 22 engage an abutment 68 of the female coupling element 2 and in this construction I achieve the particular advantage of providing more space for the four portions 37 of the actuating element 25 then would otherwise be the case, thereby assuring that these portions or detents 37 cannot come into contact with the spring portions 21, 22.

In any and all of the embodiments disclosed herein the various arresting elements, that is the elements 14, 15 and 16, can be made of one piece. In other words, the noses, arms 19, 20 and spring portions 21, 22 (or the annulus 62) can be made of synthetic plastic material and of one piece or with one another. It should be understood, however, that they need not be of one piece and that they need not be of synthetic plastic material. For instance, the spring portions 21, 22 could be of metallic material and be connected in appropriate manner with the remainder of the components of the respective arresting element.

The coupling according to the present invention assures reliable connection of the elements 1 and 2 once the same have been coupled with one another, and it assures such connection despite the fact that the various components may be produced with liberal tolerance variations. Thus, unintentional separation of the elements 1 and 2, for instance as a result of pressures in the conduits with which the elements are connected, is prevented. On the other hand, the possibility of producing the various components with liberal tolerance variations makes their manufacture simpler and less expensive. Aside from this, the components are so configurated that they can be assembled readily and speedily.

The blocking forces, that is the axial and the radial forces which develop when a stress acts upon the coupling in a sense tending to separate the male and female elements 1 and 2 at a time when this is not specifically desired, can be withstood by the novel coupling in particular the simple manner, and especially in radial direction without yielding. The actuating element 25 is reliably and simply guided for longitudinal displacement and the internal components are reliably connected against contamination. Moreover, a high resistance to relative angular displacement between the actuating element 25 and the female coupling element 2 is provided, and is provided in a simple manner. By having the arresting element or elements perform the earlier outlined multiple functions, and by utilizing only two of the noses 13, only a small number of individual components is required. This not only simplifies the construction overall, but also makes possible a short axial length for the complete coupling. This requires a minimum of space, saves material and results in a coupling which is both aesthetically pleasing and easy to handle. The engagement and disengagement of the elements 1 and 2 of the novel snap coupling is simple and rapid, requiring no skill at all and resulting in each instance in a virtually fool proof coupling or uncoupling of the male and female elements, as the case may be.

It will be understood that each of the elements described above, or two or more together, may also find a useful application in other types of constructions differing from the types described above.

While the invention has been illustrated and described as embodied in a snap coupling for fluid conduits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims. The components of the snap coupling are produced from synthetic plastic, in advantage the nut from polyamide, reinforced with glass fiber, the male and female coupling element from polypropylene, the actuatin element from ABS - material (acrylbtadien-styrol) and the arresting elements from acetal resin.

What is claimed as new and desired to be protected by Letters Patent is set forth in the appended claims:

1. A snap coupling for fluid conduits, comprising an elongated female coupling element having a wall portion bounding an inner space and provided with apertures communicating with the latter; a male coupling element removably accommodated in said inner space; an actuating element externally surrounding said female coupling element and being shiftable longitudinally thereof from a normal resting position to an operative position; arresting means comprising a plurality of noses each biassed through one of said apertures into said space, pairs of arms extending from said respective noses in opposite directions, each of said arms being configured substantially to resemble one-quarter of a circle and having a free end, pairs of spring portions projecting in mutually opposite directions from said respective nose and being located in a plane which at least substantially parallels the plane of said arm, two arresting elements located at opposite circumferential sides of said female element and each having one of said noses, a pair of said arms and a pair of said spring portions curved in at least substantial conformance with the respective arm, and cooperating abutments provided on said male coupling element and engageable with said noses so as to couple said male and female elements with one another; releasing means for releasing said arresting means, comprising cooperating lever portions on said arresting means and engaging portions engaging said free ends of said arms on said actuating element for effecting pivotal displacement of said noses out of said inner space in response to shifting of said actuating element to said operative positions thereof; and abutment means operative for preventing radial displacement of said arresting means with reference to said coupling elements.

2. A snap coupling as defined in claim 34, said abutment means comprising an annular member mounted within said female coupling element and engageable with said arresting means, said annular member being received with a snap action in a recess provided in said female coupling element and having a bead; said actuating element comprising a projection engageable with said bead for axially fixing of said annular member; said actuating element being annular and having one axial end portion facing axially towards and another axial end portion facing axially away from said female coupling element; and further comprising a plurality of axially extending grooves provided in said one axial end portion; a corresponding plurality of guide ribs provided on said female coupling element and each extending into one of said grooves; guide means guiding said actuating element for sliding displacement on said female coupling portion between said rest and operative positions with at most slight play.

3. A snap coupling as defined in claim 1, wherein said arresting elements are made of synthetic plastic material.

4. A snap coupling element as defined in claim 3, wherein said arresting elements are integral one-piece elements.

5. A snap coupling as defined in claim 1, said arresting means comprising two of said noses, said spring portions defining together a circumferentially complete annulus, and said annulus and arms being located in at least substantially parallel planes.

6. A snap coupling as defined in claim 5, and further comprising connecting portions connecting said annulus and arms with one another in the region of said noses.

7. A snap coupling as defined in claim 1, wherein said free ends of said arms project substantially radially beyond the respective spring portions for engagement by said engaging portions.

8. A snap coupling as defined in claim 5, wherein said free ends of said arms project substantially radially beyond the respective spring portions for engagement by said engaging portions.

9. A snap coupling as defined in claim 1, said coupling elements having a common axis when said male coupling element is received in said space of said female coupling element; and wherein said spring portions have terminal ends which abut said female coupling element axially and in at least substantial parallelism with said common axis.

10. A snap coupling as defined in claim 1, said abutment means being located in the region of the respective nose substantially at the level of said spring portions.

11. A snap coupling as defined in claim 10, said abutment means comprising cooperating abutment portions provided in an inner circumferential wall of said actuating element and on said arresting means, respectively.

12. A snap coupling as defined in claim 1, said abutment means being provided only on said female coupling element so as to assure transmission of effective axial and radial stresses into said female coupling element.

13. A snap coupling as defined in claim 12, said abutment means comprising pins means secured in said female coupling element.

14. A snap coupling as defined in claim 1, said arresting means comprising an annular portion surrounding said female coupling element and being connected thereto with a snap action, so as to fix said arresting means against displacement relative to said female coupling element.

15. A snap coupling as defined in claim 14, said annular portion including a plurality of lugs located intermediate said arresting means and said female coupling portion and having hook-shaped endportions arranged for snap-action engagement with said female coupling element.

16. A snap coupling as defined in claim 14, wherein said annular portion also constitutes an abutment operative for preventing radial displacement of said arresting means with reference to said coupling elements.

17. A snap coupling as defined in claim 1, wherein said spring portions have hook-shaped endportions.

18. A snap coupling as defined in claim 17, wherein said female coupling element comprises at least one abutment portion, and wherein said hook-shaped endportions engage said abutment portion.

19. A snap coupling as defined in claim 17, wherein said hook-shaped endportions interengage with one another.

20. A snap coupling as defined in claim 1, wherein said abutment means is a circumferentially incomplete annular member having two endportions provided with releasably interengageable means.

21. A snap coupling as defined in claim 20, said arms having one side facing axially away from said male coupling element, said spring portions being provided at said one side and abutting against an abutment provided on said female coupling element.

22. A snap coupling as defined in claim 1, said noses, arms and spring portions all being of one piece and of synthetic plastic material.

23. A snap coupling as defined in claim 1, wherein said spring portions act upon said actuating element, biasing the same to said rest position thereof.

24. A snap coupling as defined in claim 1, said actuating element being annular and having an inner circumferential surface surrounding said arresting means; and wherein said engaging portions are engaging projections provided on said inner circumferential surface.

25. A snap coupling as defined in claim 24, at least some of said engaging projections defining between themselves a guide recess extending in axial direction of said annular arresting element; and further comprising a guide rib provided on said female coupling element extending axially of the same and being slidably received in said guide recess.

* * * * *